United States Patent
Hoelsæter

[11] Patent Number: 5,870,246
[45] Date of Patent: Feb. 9, 1999

[54] REFERENCE BRIDGE FOR SUPPORTING A TAPE CARTRIDGE WITHIN A TAPE DRIVE

[75] Inventor: Håvard Hoelsæter, Oslo, Norway

[73] Assignee: Tandberg Data ASA, Oslo, Norway

[21] Appl. No.: 838,163

[22] Filed: Apr. 16, 1997

[51] Int. Cl.[6] .................... G11B 15/00; G11B 21/16
[52] U.S. Cl. ........................... 360/96.5; 360/104
[58] Field of Search .................. 360/96.5, 104–106, 360/128, 129

[56] References Cited

U.S. PATENT DOCUMENTS

| | | | |
|---|---|---|---|
| 3,692,255 | 9/1972 | von Behren | 242/343.2 |
| 4,438,879 | 3/1984 | Rudi | 360/96.3 |
| 4,489,355 | 12/1984 | Rudi | 360/96.5 |
| 4,491,890 | 1/1985 | Rudi | 360/106 |
| 4,609,959 | 9/1986 | Rudi | 360/106 |
| 4,628,386 | 12/1986 | Chabrolle | 360/104 |
| 4,636,903 | 1/1987 | Rudi | 360/132 |
| 4,833,558 | 5/1989 | Baheri | 360/106 |
| 5,251,086 | 10/1993 | Beisner et al. | 360/106 |
| 5,323,280 | 6/1994 | Rudi | 360/96.5 |
| 5,331,485 | 7/1994 | Bryer | 360/96.5 |
| 5,371,639 | 12/1994 | Bryer | 360/96.5 |
| 5,373,405 | 12/1994 | Fischer | 360/96.5 |
| 5,373,406 | 12/1994 | Jansen | 360/96.5 |
| 5,440,435 | 8/1995 | Busengdal et al. | 360/96.5 |
| 5,448,432 | 9/1995 | Saga et al. | 360/96.5 |
| 5,629,816 | 5/1997 | Busengdal et al. | 360/96.5 |

*Primary Examiner*—Jefferson Evans
*Attorney, Agent, or Firm*—Hill & Simpson

[57] ABSTRACT

A floating support for a tape cartridge inserted into a tape drive, the floating support holding a magnetic head and resiliently supported off stationary structure in the tape drive. The floating support resiliently clamps portions of the cartridge against stationary portions of the tape drive which sets the reference positions of the cartridge with respect to the magnetic head. The floating support prevents the transmission of unwanted forces to the magnetic head support structure which would otherwise end to deform such structure. A floating bridge holding a magnetic head is provided having three leaf springs which engage a bottom wall of a tape cartridge to resiliently clamp the bridge to the cartridge to set the corresponding zenith and azimuth references for the magnetic head. The floating references also makes it possible to separate the cartridge fixing points and the cartridge reference points, in order to make the cartridge holding less sensitive to shock and vibrations.

27 Claims, 15 Drawing Sheets

REFERENCE BRIDGE FOR SUPPORTING A TAPE CARTRIDGE WITHIN A TAPE DRIVE

BACKGROUND OF THE INVENTION

The present invention relates to a tape drive for receiving a tape cartridge or cassette, which provides a structure for receiving the cartridge and holding the cartridge at a precise position relative to a magnetic head held by the tape drive. This precise position is defined by the references "A-level" and "B-level". The A-level is a line which defines a preset position of a front of the cartridge with respect to the magnetic head in a direction toward and away from the magnetic head. The A-level sets the degree of insertion of the cartridge toward the magnetic head and the roll angle of the cartridge with respect to the head. The B-level is a line perpendicular to the A-level and which defines a height reference, referring to a horizontally disposed cartridge, or in other words, a position of the cartridge along a direction across a width of the tape, and also the zenith and azimuth angles of the cartridge with respect to the head.

In prior tape drives, a bridge is provided which holds the cartridge at its reference position for access by a magnetic head which is also held on the bridge. However, in these devices, the bridge is relatively fixed and the cartridge is strained toward the reference positions on that bridge. Variations in tolerances between the cartridge and the cartridge supports can then cause varied strains or twists on the bridge and misalignments between the magnetic head and the tape. On prior tape drives, the cartridge was fixed at the reference points. This fixation however can cause the center of mass of the cartridge to be located outside of the triangle formed by the fixing points. This can lead to a high shock/vibration sensitivity.

SUMMARY OF THE INVENTION

It is an object of the present invention to provide a cartridge reference system within a tape drive for precisely aligning a tape cartridge with a magnetic head or other device of the tape drive. It is an object of the present invention to provide a cartridge supporting structure within the tape drive which resists the imparting of force to a supporting structure for the magnetic head.

It is an object of the present invention to allow for the separation of the cartridge reference points and the cartridge fixing points. Achieving this object allows for the advantage of larger "fixing triangle" which includes the center of mass of the cartridge therein, and therefore provides a more vibration/shock insensitive holding of the cartridge within the tape drive.

It is an object of the invention to provide a tape drive having a bridge for holding a magnetic head, the bridge providing a supporting arrangement for holding a cartridge to the magnetic head, the cartridge held at a precise reference position with respect to the magnetic head.

It is an object of the present invention to provide a floating bridge which supports a cartridge in a tape drive resiliently and also supports a magnetic head, the cartridge held together with the magnetic head on the bridge.

It is an object of the present invention to provide a bridge which is three point loaded with regard to the tape drive. It is an object of the present invention to provide a cartridge which is three point loaded onto the bridge. It is an object of the invention to provide a floating bridge which resists twisting and other forces otherwise conveyed by a cartridge constrained to meet the A and B reference levels. It is an object of the invention to provide a floating bridge which is connected to the cartridge to follow the movement of the cartridge without receiving strains and twists from the cartridge. It is an object of the invention that outward contact of the cartridge and variation of bending forces leads only to strain on the cartridge itself, relative to the housing and not to the bridge holding the magnetic head. It is an object of the invention that the bridge never be strained by more than three spring forces and its own weight including its magnetic head and head positioning device, such as the head stepper mechanism.

It is an object of the invention to provide that the cartridge and bridge are loaded with spring forces which merely give a point strain and no factor or moment arm. The point strains should be balanced by the counterforce of the cartridge, so that the reference points will only be exposed to a compression too low to twist the bridge.

It is an object of the invention to provide guiding means for guiding the cartridge laterally into a position on the floating bridge. It is an object of the invention to provide a floating bridge which can be used with or without a motorized pull in of the cartridge. It is an object of the invention to provide a housing which fits both TRAVAN and ordinary Mini Cartridges. Both type cartridges are guided sideways and heightwise to ensure accurate induction toward the bridge.

The objects are achieved by a floating bridge having a support surface for receiving a tape cartridge and a head mounting structure precisely arranged with the support surface, the bridge being spring loaded with respect to a tape drive housing. The tape drive housing provides guide rails for guiding a top surface of the cartridge being inserted. The bridge is resiliently supported by being spring loaded to the housing at three points by leaf springs. The springs are opposed to a thickness of the cartridge and pressed against the housing such that only a point strain is exerted on the bridge with no factor or moment arm. These point strains are balanced by the counterforce of the cartridge so that the reference points will only be exposed to a compression too low to twist the bridge.

The floating bridge can be secured to the housing in, for example, two ways including: i) using the two elongated or oval holes in the bridge and two cylindrical pins fixed to the tape drive housing and extending it to the oval holes. The placing of the pins in oval holes is determined so that the A-reference is directly aligned with a pin center which is equal to a thickness center of the base plate. Thus, only a point strain or compression is exerted on the securing mechanism, the pins; or ii) using three flat springs mounted to resiliently support the bridge from the tape drive housing.

The cartridge is positioned laterally or side to side, relative to the bridge by angled side walls (chamfered flanges). These side walls are placed just before the point where the cartridge is locked toward the A-reference.

The magnetic head and the head stepper mechanism are secured in the bridge. The weight of these parts is compensated by proper dimensioning of a zenith spring and the placing of the oval holes for bearing of the bridge. The capstan motor is secured in the housing in a manner to avoid twists or vibrations.

The bridge member can be used with or without a motorized pull in of the cartridge. Any pull in is only required to move in an axis parallel with the insertion line of the cartridge, as it is the bridge which is being pulled up from/lowered towards the reference level. It is adequate if a locking mechanism can ensure locking only against the line of the A-reference. The locking mechanism must be independent on the right and left sides to ensure contact with the A-reference.

Where the cartridge must be stabilized on three separate fixing points, not necessarily the reference points, a zenith contra spring force must be added. The zenith contra spring force must be larger than the zenith spring force.

The separation of the cartridge fixing points and the cartridge reference points will not affect the alignment between the cartridge base plates (defining the cartridge reference points) and the head fixed in the floating reference bridge. If the cartridge fixing points are made in a material with good thermal conductivity, the fixing points will also serve as heat sinks.

BRIEF DESCRIPTION OF THE DRAWINGS

FIG. 3a is a partial plan view of the tape drive and cartridge arrangement of FIG. 3;

DETAILED DESCRIPTION OF THE PREFERRED EMBODIMENTS

Figure 1:
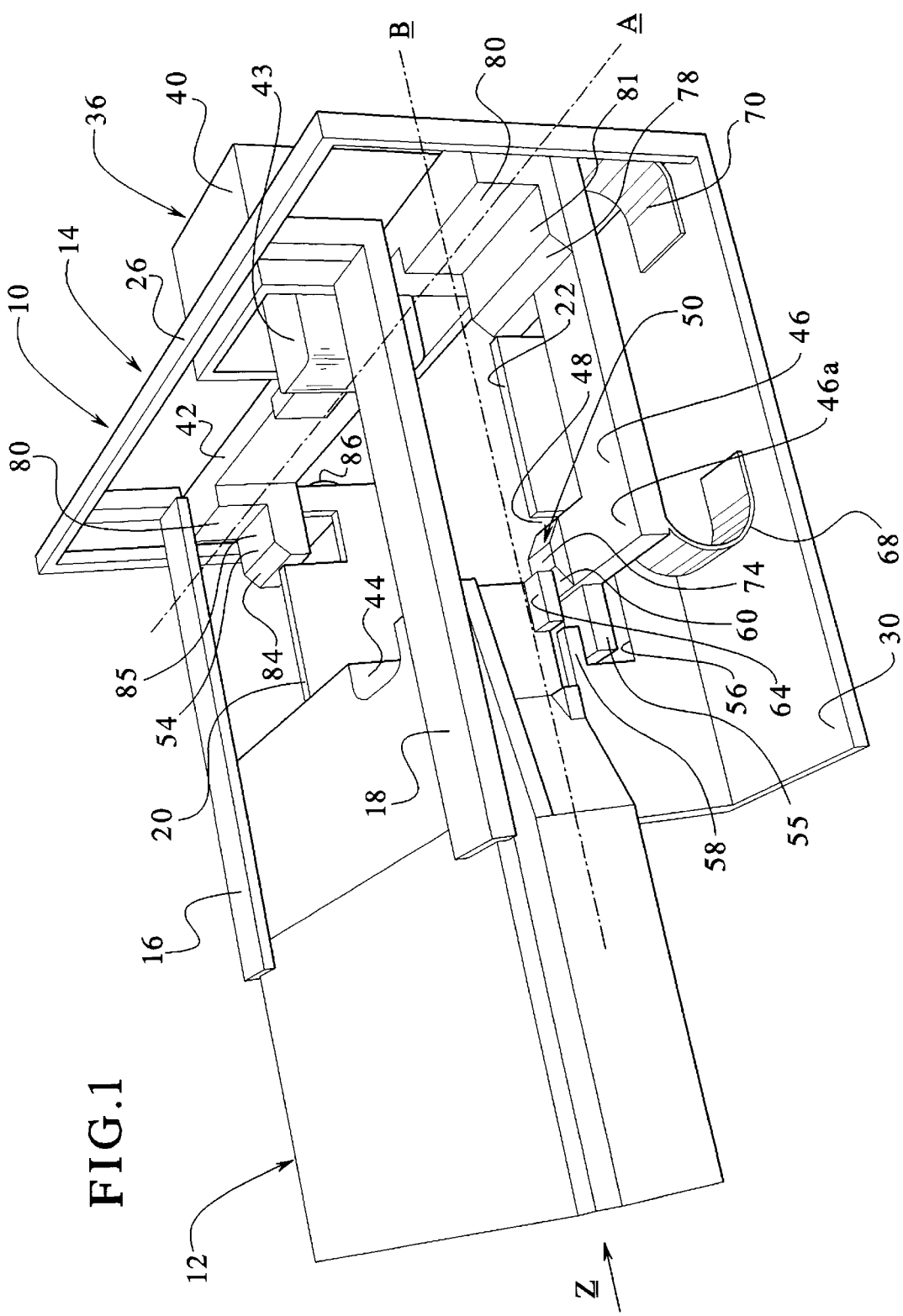
FIG. 1 is a perspective view of a tape drive and cartridge arrangement according to an embodiment of the present invention in an initial stage of cartridge loading.

FIG. 1 illustrates a tape drive 10 receiving a tape cartridge 12 therein for reading or writing on magnetic tape contained within the cartridge 12. The cartridge 12 is inserted in a direction Z into the tape drive 10. The tape drive 10 provides a skeletal housing structure 14 having upper guide rails 16, 18 for guiding the cartridge 12. Also, arranged beneath the guide rails 16, 18 are support walls 20, 22 which support a bottom wall 23 of the cartridge 12 inside the housing 14. The guides 16, 18 and the walls 20, 22 proceed rearwardly from a rectangular frame 26 at a front of the housing 14. Extending from the frame 26 and formed with the wall 22 in an L-shaped manner, is a support platform 30. On an opposite side of the frame 26 is a shortened support platform 32 extending from the frame 26 and formed with the wall 20 in a L-shaped manner.

Mounted partially in front of the rectangular frame 26 ("front" being the right side in FIG. 1) and extending through the frame 26 rearwardly is a floating bridge support 36 having a magnetic head housing frame 40 connected to a lateral beam 42 which spans nearly across the rectangular frame 26. The housing frame 40 holds a magnetic head 43, designed to fit into a window 44 of the cartridge 12. Extending forwardly from the beam 42 is a first support arm 46 which extends over the support platform 30. A gap 48 in the wall 22 allows a guiding arm 50 to extend therethrough to a position over the wall 22. On an opposite side of the beam 42 extending rearwardly therefrom is a guiding arm 54. The guiding arm 50 includes a tab portion 55 interfit into a recess 56 of the gap 48, the recess 56 partially defined by an overhang bar 58 which retains the tab 55 to an upward limit. The guiding arm 50 further includes a rearwardly disposed inclined surface 60 which comes into abutment with a leading end bottom wall portion 64 of the cartridge 12 as it is being inserted. The inclined surface 60 causes the depression of the lever 46 at a rear side 46a thereof. The lever 46 is supported by a rearwardly disposed leaf spring 68 and a forwardly disposed leaf spring 70.

Although the orientation described in FIG. 1 of the housing 14 and bridge 36 are exemplary, other orientations, such as turning the structure or its components upside-down would also be encompassed by the invention.

Figure 2:
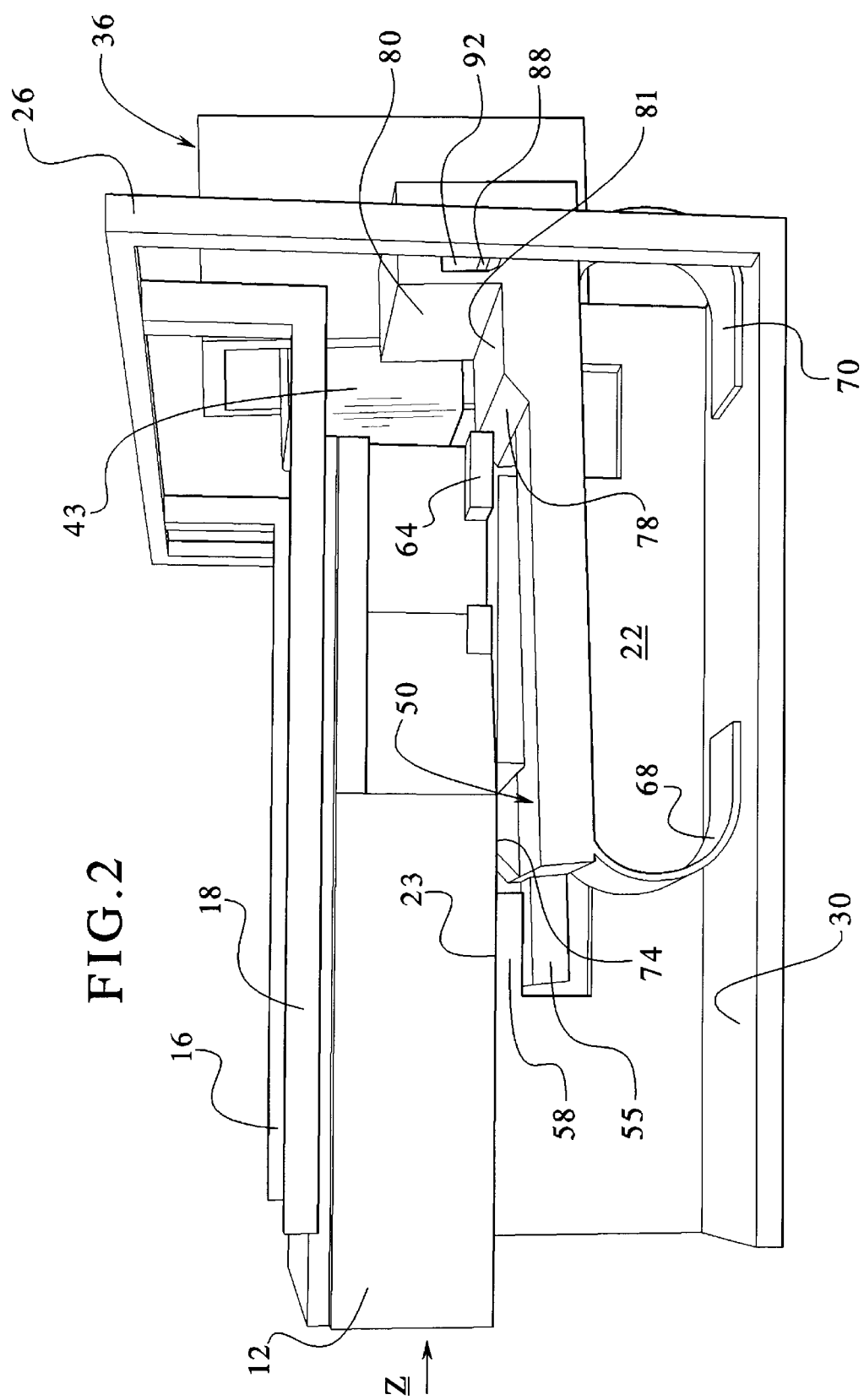
FIG. 2 is a perspective view of the embodiment of FIG. 1 in a further stage of cartridge loading.

FIG. 2 shows the cartridge 12 proceeding further inwardly in the direction Z. The floating bridge 36 has tipped downwardly and rearwardly under the compression of the leaf spring 68 and the cartridge bottom 23 has risen up to be supported onto a top surface 74 of the support arm 50. Further progression of the cartridge 12 causes the portion 64 of the cartridge to impact an inclined guide surface 78 which causes a depression of the floating bridge 36 at a forward end thereof and the compression of the spring 70.

A means for opening a dust cover which would normally close the window 44 can be arranged on the housing or bridge such as disclosed in U.S. Pat. Nos. 5,323,280 or 3,692,255.

Figure 3:
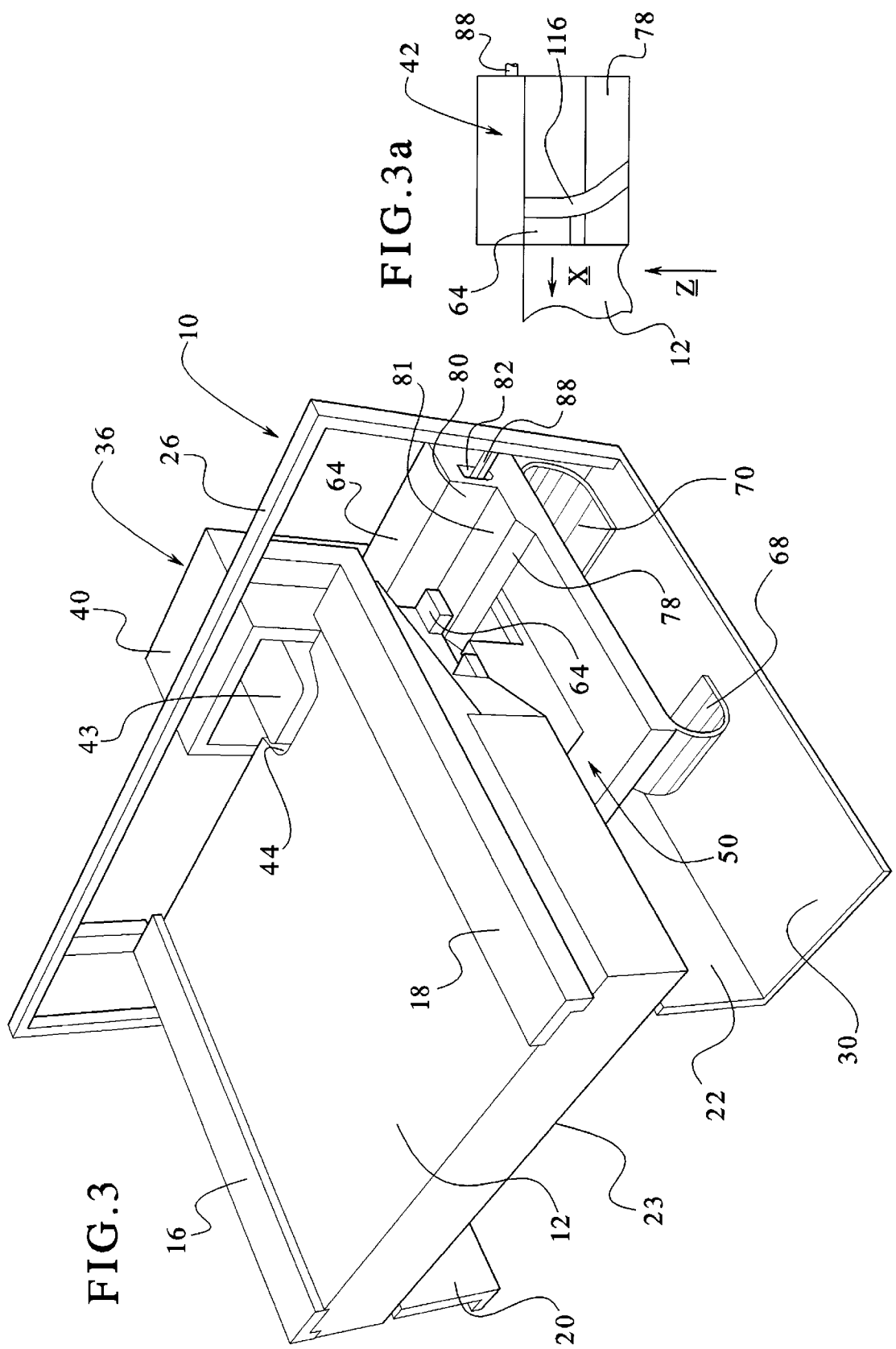
FIG. 3 is a perspective view of the embodiment of FIG. 1 in a final stage of cartridge loading.
Figure 5:
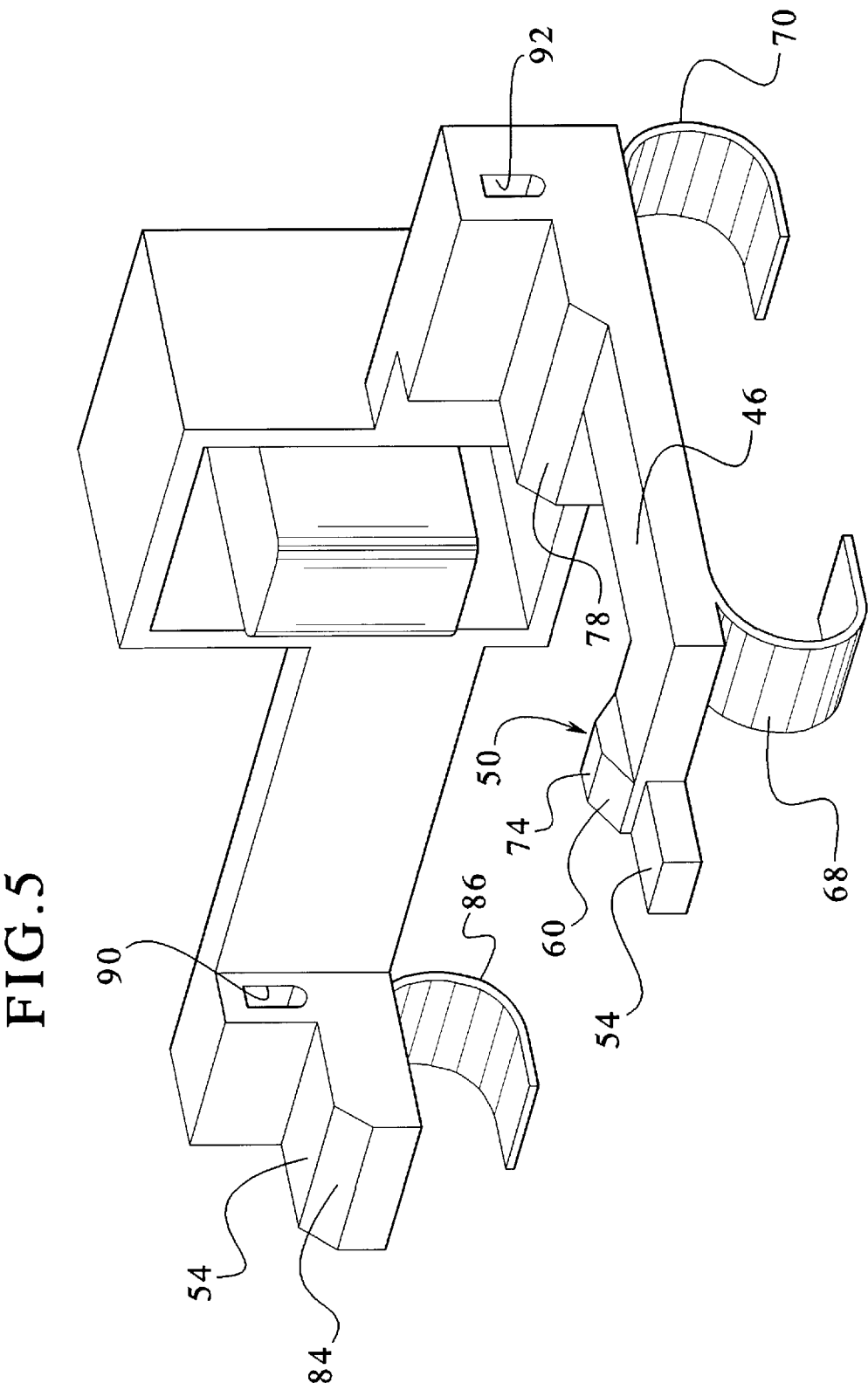
FIG. 5 is a perspective view of a floating bridge from FIG. 1.
Figure 6:
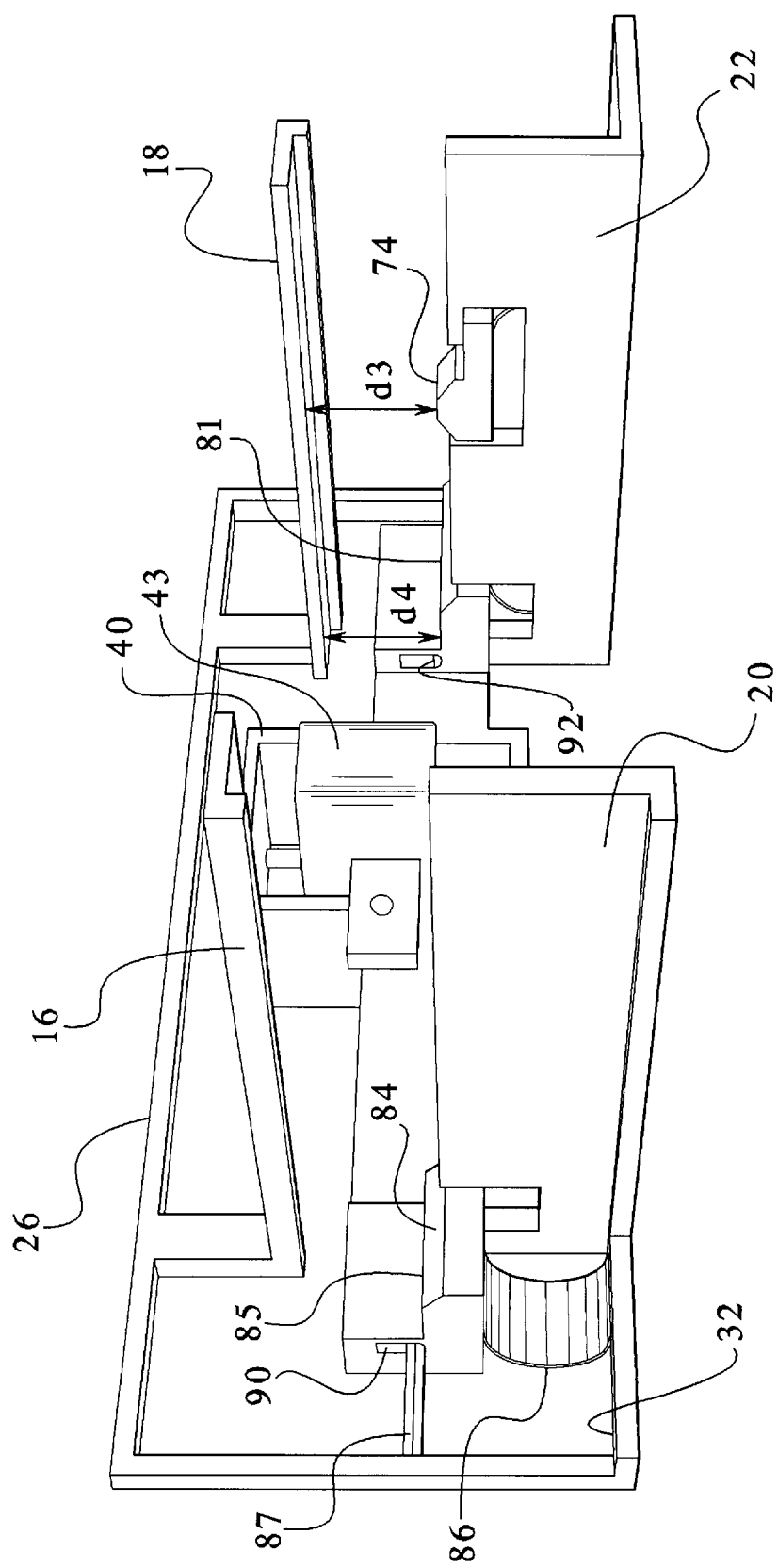
FIG. 6 is a perspective view of the housing and bridge of FIG. 1 with the cartridge removed for clarity.

As shown in FIG. 3, the cartridge is fully loaded with the portion 64 abutting against a front wall 80 of the bridge 36. The portion 64 rests on a surface 81 of the bridge 36. During this insertion on an opposite side of the beam, a guide surface 84 of the guide arm 54 has been depressed by a portion 64a of the cartridge bottom wall, the portion 64a constructed and oriented in mirror image fashion to the portion 64, caused the depression of the floating bridge 36 at that end under compression of a third leaf spring 86 and the portion 64a of the cartridge bottom wall rests on a surface 85 of the bridge 36 (see FIGS. 5 and 6).

FIG. 3a discloses a feature not shown in the other figures for clarity. Formed adjacent the front wall 80 which defines a reference level A of FIG. 2, is a chamfered sidewall 116 arranged on the edge of surfaces 78 and 81. The sidewall 116 is inclined toward the tape head 43 proceeding forwardly. Though not shown, a similar chamfered sidewall is arranged on the edge of surfaces 84 and 85 on the opposite side of the bridge 36 and constructed in mirror image fashion to sidewall 116. These chamfered sidewalls including the sidewall 116 slidingly direct the cartridge in a lateral direction X to precise lateral alignment as the cartridge 12 and particularly the portions 64 and 64a proceed the last short distance of travel toward the front wall 80.

Thus, under the resiliency of the three leaf springs 68, 70, 86, the floating reference bridge 36 is resiliently pressed to bottom portions of the cartridge to set a precise relative position between the cartridge 12 and the magnetic head 43 held within the housing 40 on the floating bridge 36. The springs 68, 70, 86 create a three point loading pressing the cartridge 12 up into the guides 16, 18.

The bridge is contacted to the housing structure 14 only at the springs 68, 70, 86 and at the pins 87, 88 in the slots 90, 92. The beam 42 is pivotally supported by pins 87, 88 proceeding inwardly from the rectangular frame 14 to engage in elongate slots 90, 92 formed on the floating bridge beam 42. The pins 87, 88 are arranged to correspond to the elevation of the cartridge portions 64, 64a as bearing against the end walls 80. As such, no torque about the pins is created by an offset loading by the cartridge against the wall 80, i.e., the portions 64, 64a are vertically aligned.

Figure 4:
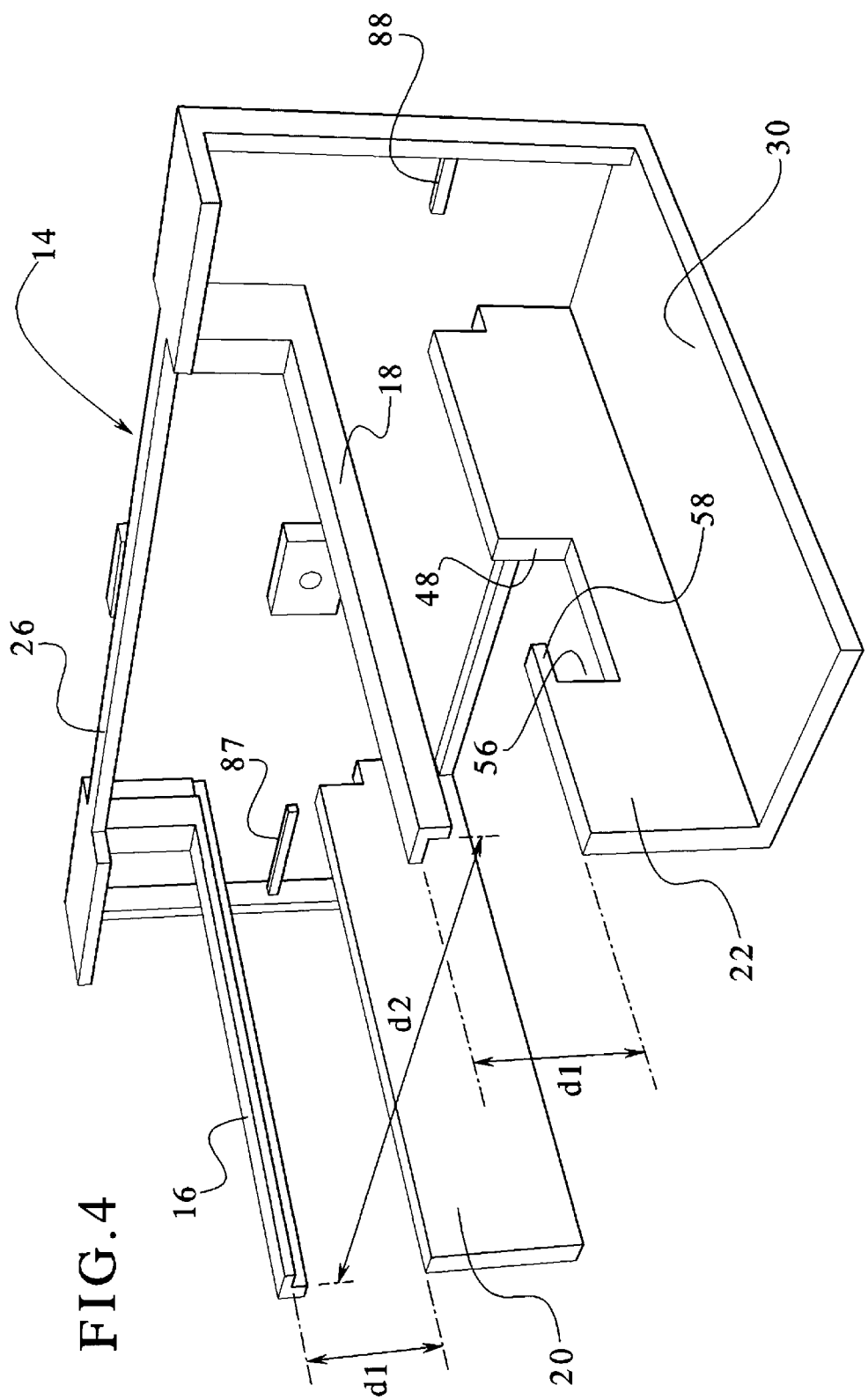
FIG. 4 is a perspective view of a housing as shown in FIG. 1.

The following dimensional relationships are according to a preferred embodiment of the invention. The dimensions are described in FIGS. 4 and 6. The dimension d3 shown in FIG. 6 assures that the first spring is compressed and the first reference, the surface 74, is forced down by the underside of the cartridge base plate. The dimension d4 assures that the cartridge further depresses the second and third springs 70, 86 which comprise the azimuth reference. Respectively, dimension d1 as a minimum is equal to the maximum height expected for a cartridge (such as according to "QIC-Spec"). The dimension d2 minimum is equal to the maximum width of respectively guiding track for a TRAVAN cartridge or a width of plastic cover for a mini cartridge. The dimension d3 as a maximum is equal to the minimum height of a cartridge. This will always assure contact between the zenith reference surface 74 of the bridge and the under side of the cartridge. The dimension d4 as a maximum is the minimum height of a cartridge. This will always assure contact between the azimuth reference of the bridge, surfaces 54a, and the under side of the cartridge.

Once the cartridge 12 is delivered to its Reference A and Reference B position, it can be locked in place by known means such as disclosed in U.S. Pat. No. 5,373,406. Additionally, means for motorized loading of the cartridge can be provided such as disclosed in U.S. Pat. No. 5,373, 406.

Figure 7:
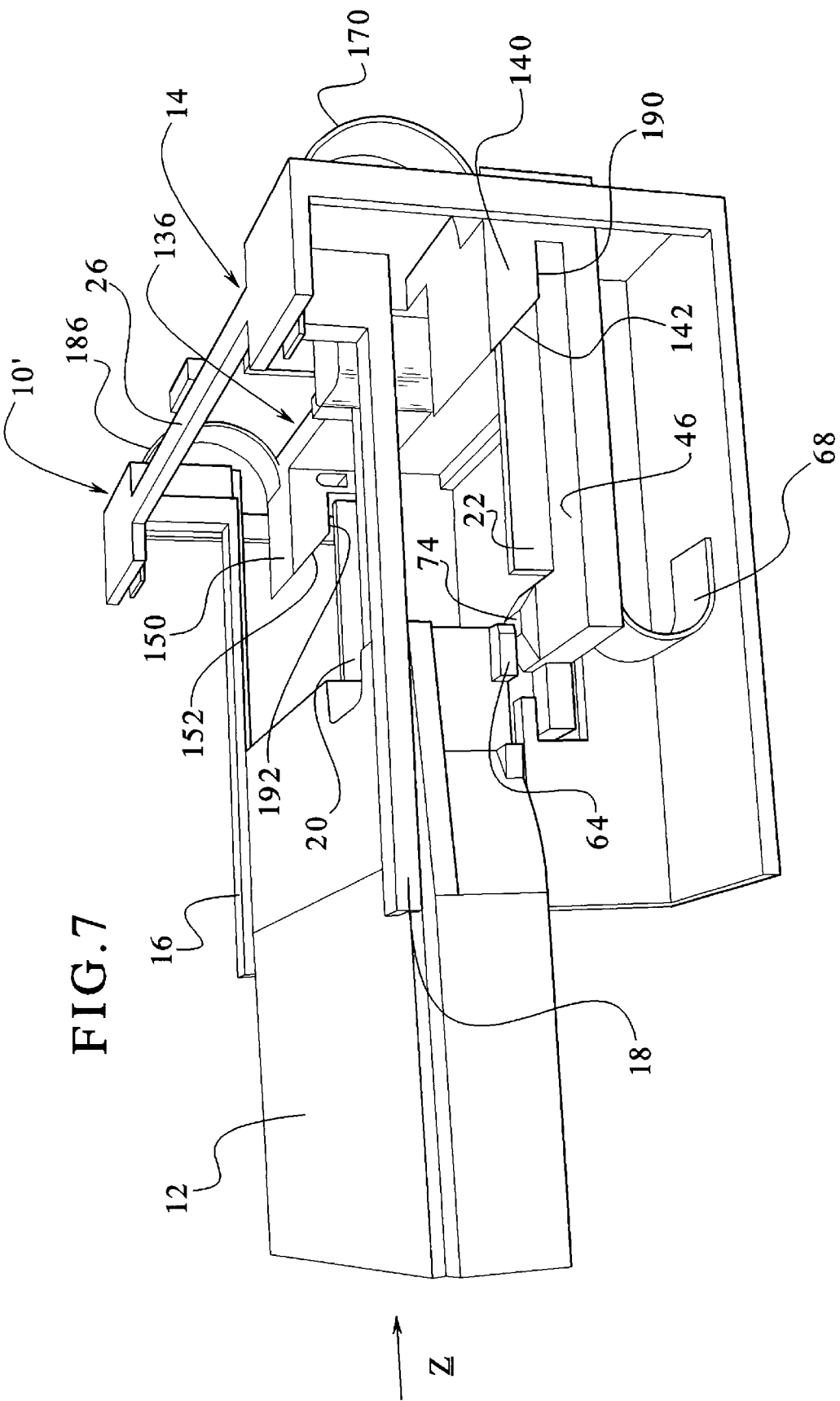
FIG. 7 is a perspective view of a further embodiment of the invention in an initial stage of cartridge loading.

FIG. 7 illustrates a second embodiment of the invention, tape drive 10', having the housing 14 but including a alternate floating bridge 136. Like components with the first embodiment are indicated with the same reference numbers. The floating bridge 136 provides the first support arm 46 and the first spring 68 as described in the initial embodiment. However, at a forward end of the support arm 46 is a rearwardly extending projection 140 having a declined guiding surface 142. At an opposite end of the beam 42 is a second rearward projection 150 having a declined guiding surface 152.

Figure 8:
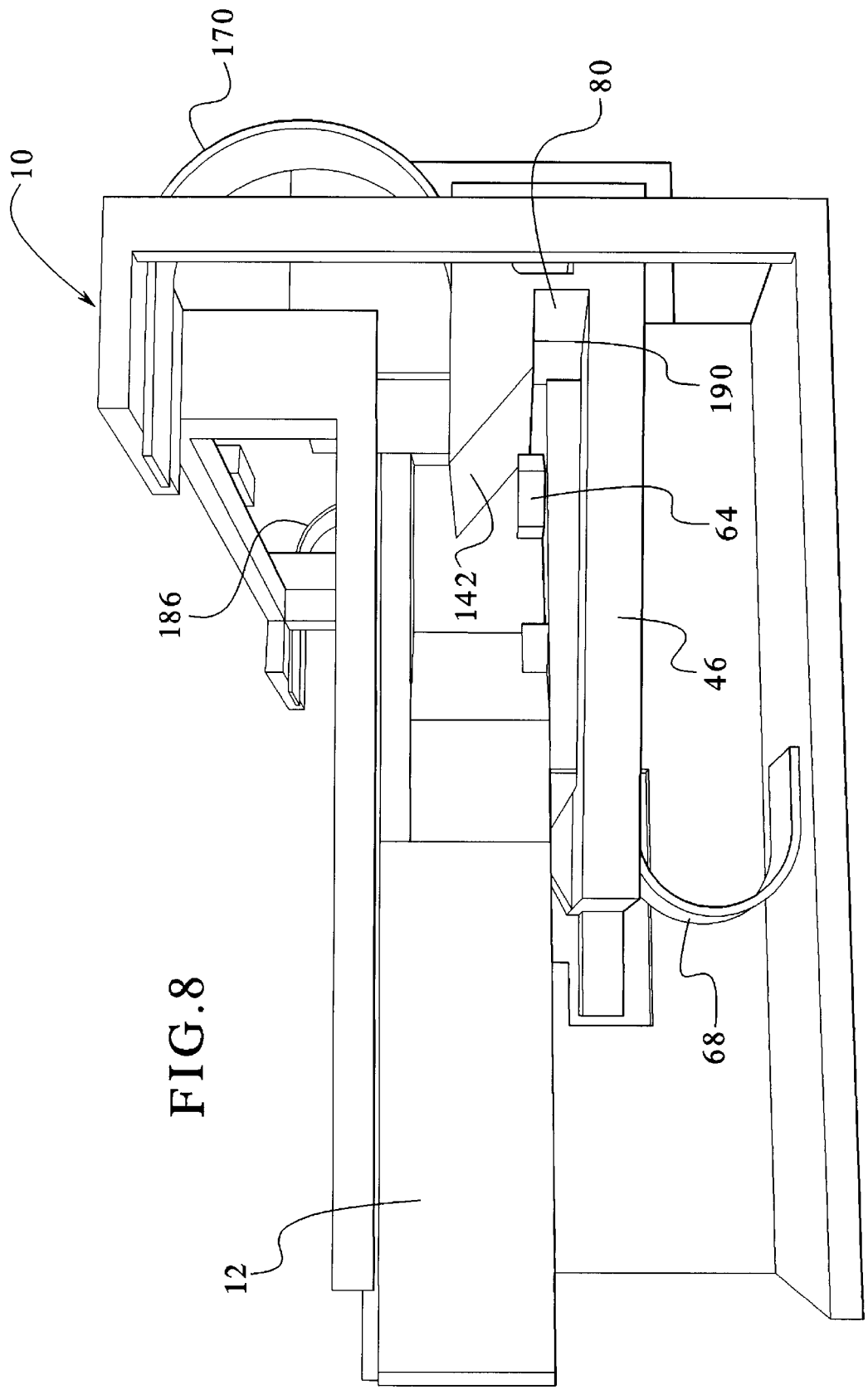
FIG. 8 is a perspective view of the embodiment shown in FIG. 7 in a further stage of cartridge loading.

FIG. 8 illustrates that as the cartridge 12 is slid further into the tape drive 10, the portion 64 impacts and is guided by the guiding surface 142 on one side and an opposite side portion 64a (not shown) is likewise guided by the declined guiding surface 152. The bridge 136 includes upwardly extending arcuate leaf springs 170, 186 (replacing the leaf springs 70, 86 in the prior embodiment). Thus, the forward end of the floating bridge 136 is biased downwardly and is slightly raised by the translation of the portions 64, 64a during insertion of the cartridge 12 to its A reference position. An under side 190, 192 of the protrusions 140, 150 eventually overlies the portions 64, 64a of the cartridge 12 to resiliently clamp the bottom wall 23 of the cartridge 12 down onto the support walls 20, 22 when the cartridge reaches the A reference position with the portions 64, 64a pressing the front wall 80. The zenith reference point, surface 74 under influence of the spring 68 urges the cartridge upward against the guide rails 16, 18.

Figure 9:
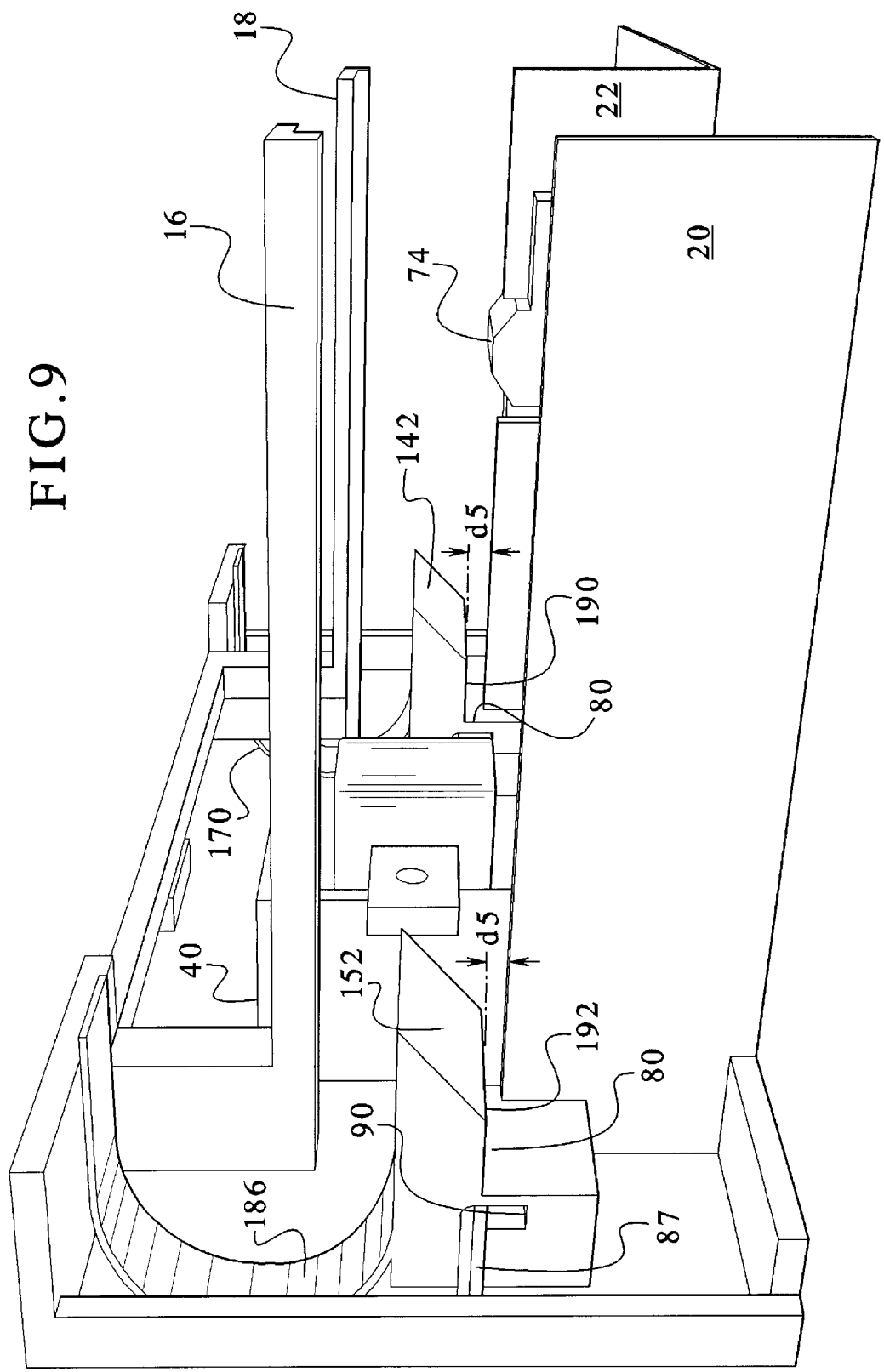
FIG. 9 is a perspective view of the bridge and housing of the embodiment of FIG. 7 with the cartridge removed for clarity.

FIG. 9 illustrates the dimension d5 maximum being advantageously equal to the minimum thickness of a cartridge base plate. This will always assure contact between the azimuth reference of the bridge, the surfaces 190, 192, and the top of the cartridge base plate, the top of the portions 64, 64a.

Figure 10:
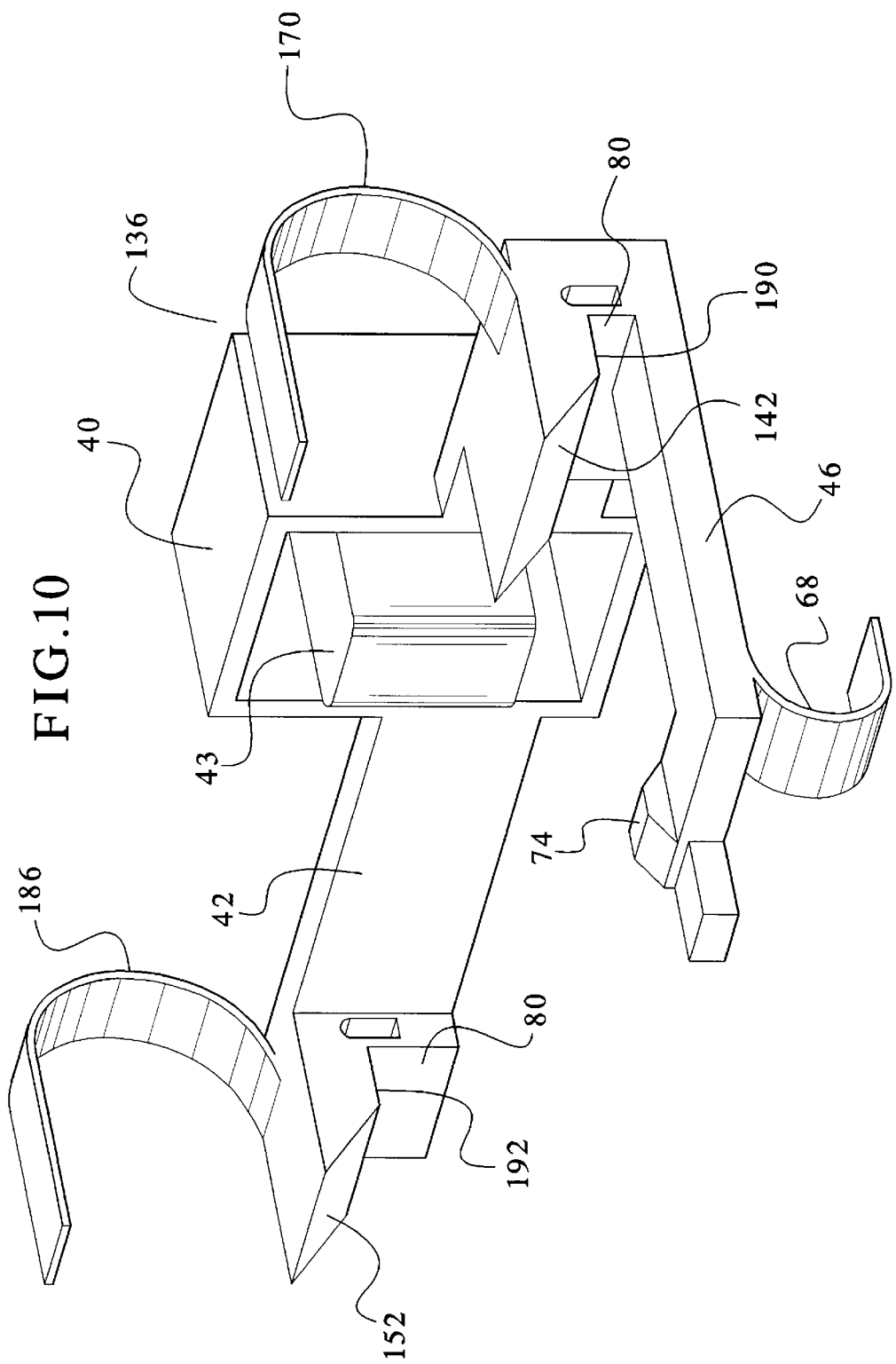
FIG. 10 is a perspective view of the bridge taken from the embodiment of FIG. 7.
Figure 11:
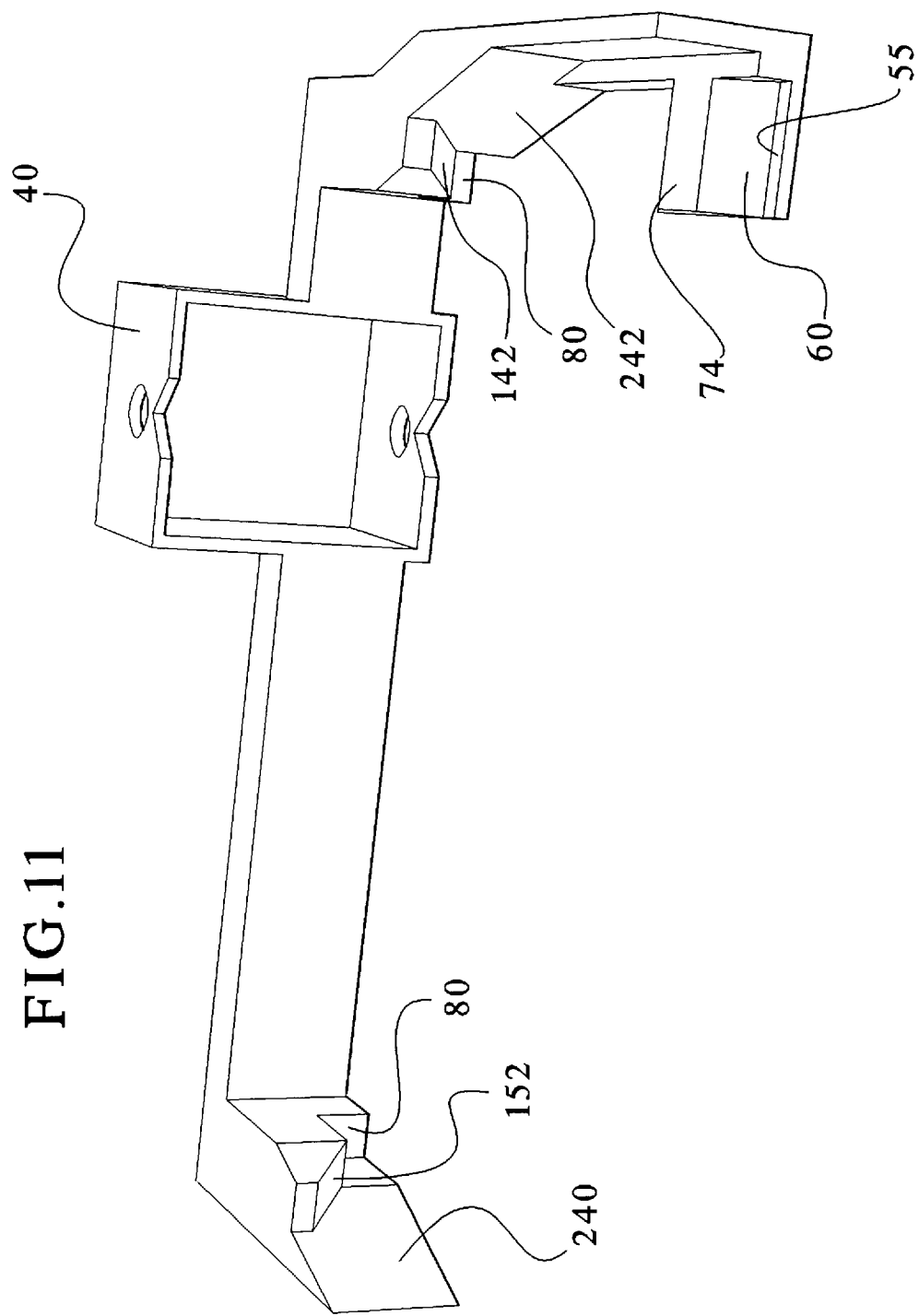
FIG. 11 is a partial perspective view of an alternate bridge to the bridge shown in FIG. 10.

FIG. 11 discloses an alternate bridge 236 to the bridge 136 of FIG. 10, wherein opposite side walls 240, 242 are provided to laterally guide the cartridge into its position at Reference A, with cartridge portions 64, 64a pressed to the bridge end wall portion 80. The side walls are angled inwardly toward the head housing 40 in a forward direction. FIG. 11 does not illustrate the head 43 or the springs 68, 170, 186 for simplicity of the figure.

Figure 12:
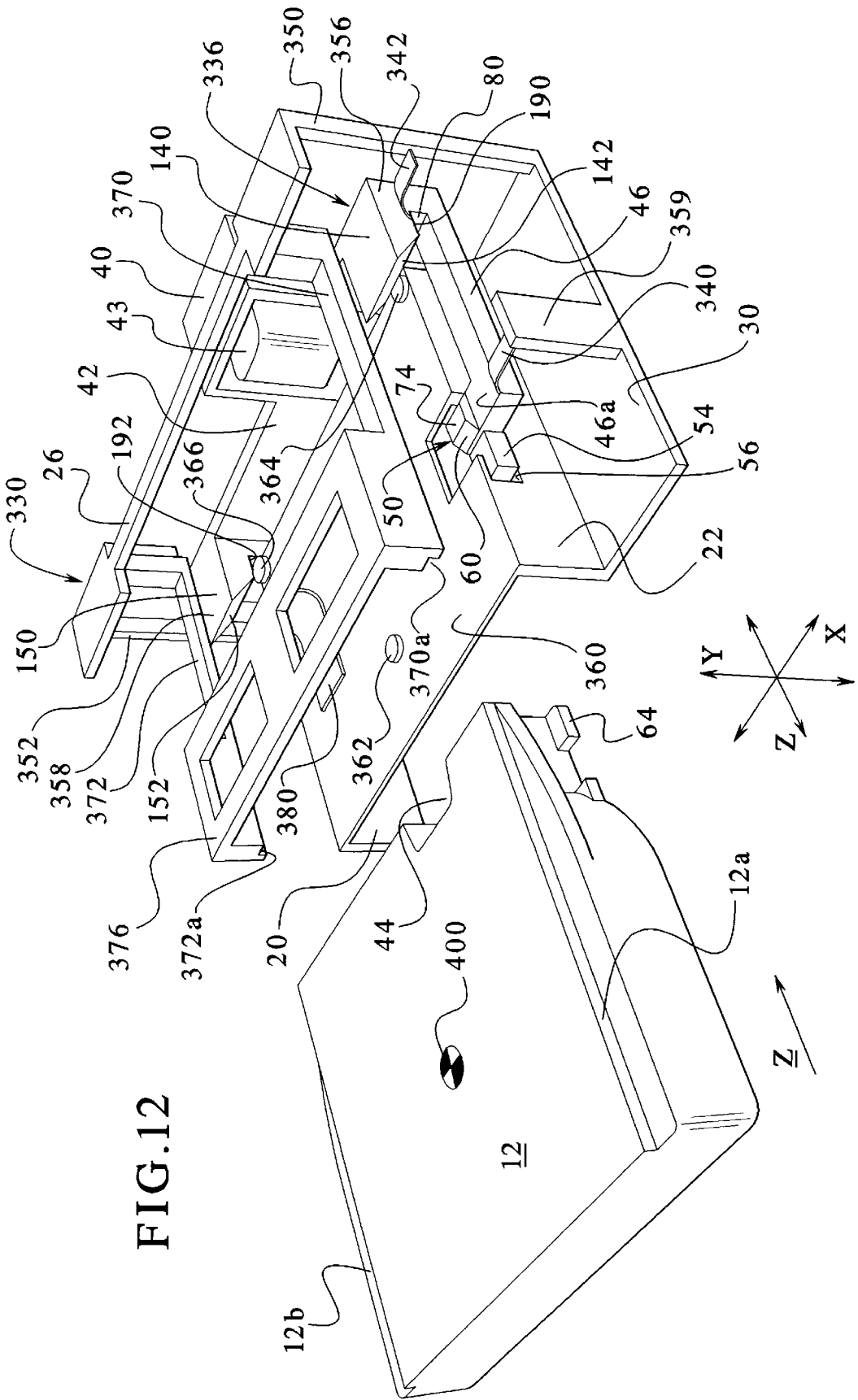
FIG. 12 is a perspective view of an alternate embodiment of the invention in an initial stage of cartridge loading.
Figure 15:
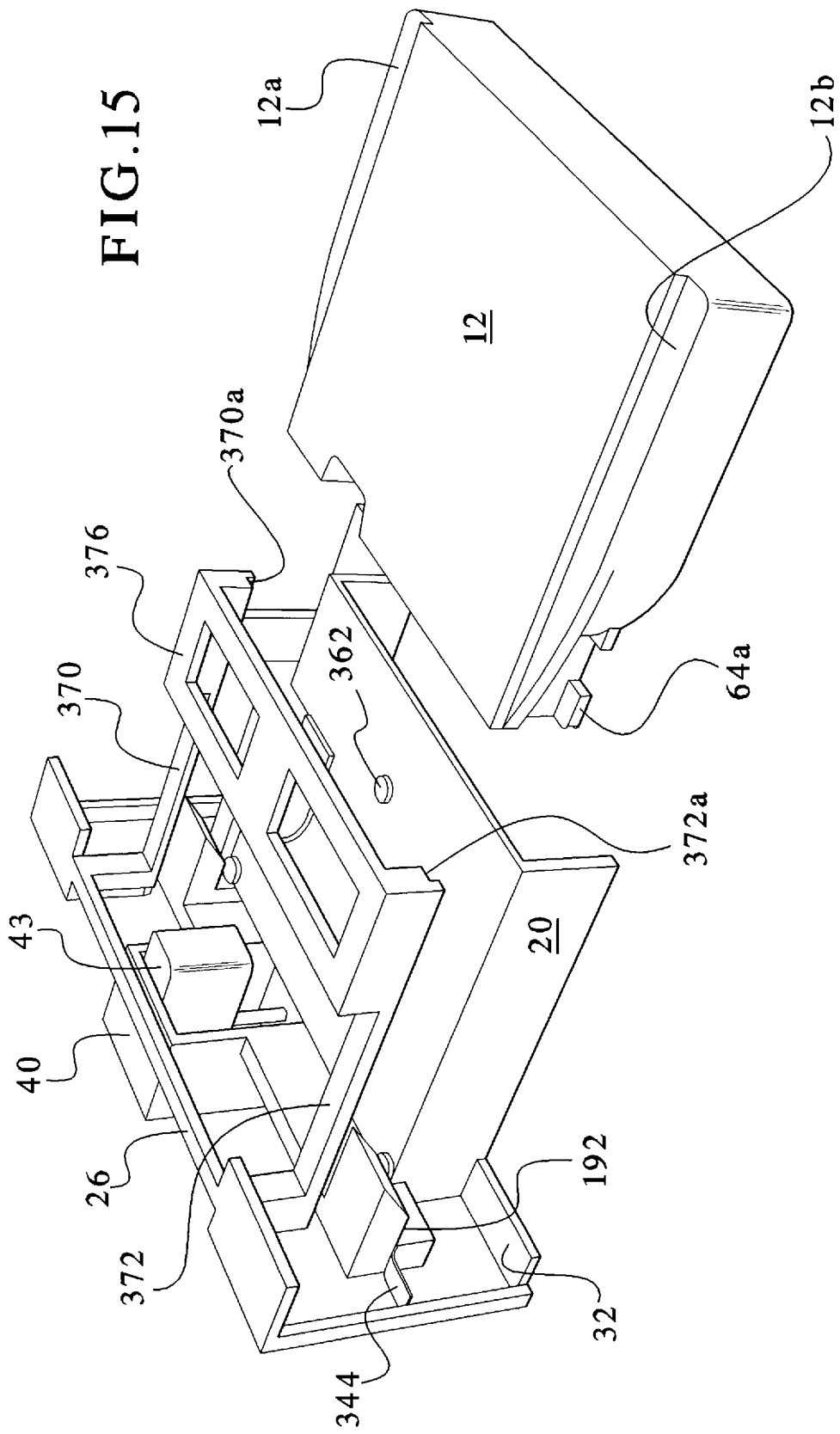
FIG. 15 is a left-side perspective view of the embodiment shown in FIG. 12.

FIG. 12 shows a further alternate embodiment of the apparatus of the present invention. Substantially identical components with the above described embodiments carry like indicator numbers. FIG. 12 and FIG. 15 show an alternate skeletal housing structure 330 holding an alternate floating bridge 336 by way of three relatively flat plate springs: a zenith spring 340, a first azimuth spring, 342, and a second azimuth spring 344 (344 shown in FIG. 15). The alternate housing structure 330 includes the rectangular frame 26 at a front end thereof. The azimuth plate springs 342, 344 extend from side walls 350, 352 of the Frame 26 and are affixed to the floating bridge 336 at a first end 356 and a second end 358 thereof respectively. The rearwardly disposed zenith plate spring 340 is connected to the first arm 46 of tire bridge and to a pedestal 359 extending from the support platform 30. The three springs 340, 342, 344 are disposed in a substantially identical pattern to the positioning of the springs 68, 170, 186 as shown in the embodiments of FIG. 7, for example. The floating bridge 336 is identically configured to that shown in FIG. 10 except that no oval holes 90, 92 are required for pins, and the springs 340, 342, 344 replace the aforementioned springs 68, 170, 186.

The resilient load of the springs 340, 342, 344 causes a holding of the floating bridge 236 to the housing structure 330 which is stiff in the z and x directions. In the y direction, a resilient translation of the floating bridge 236 with respect to the housing structure 330 is possible. Also, an x-axis resilient rotation of the floating bridge 236 with respect to the housing structure 330 is possible.

The housing structure 330 includes a support floor 360 having formed thereon three fixing portions 362, 364, 366, in the form of raised disks. The fixing portions can serve as heat sinks. The fixing portions 364, 366 are located at a front side of the floor structure 360 and below the undersides 190, 192 of the protrusions 140, 150. Extending from the frame 26 rearwardly are L-shaped cantilever guide arms 370, 372 arranged in parallel on opposite sides of the housing frame 40. The L-shaped guide arms 370, 372 are connected together by an overhead bridge 376 shaped in a squared figure "8" shape. The guide arms 370, 372 include a recessed groove 370A, 372A respectively which receive shoulders 12A, 12B of the cartridge 12 for lateral guiding of the cartridge into the housing 330. Connected to a bottom side of a center portion of the bridge structure 376 is a prone J-shaped leaf spring 380. The leaf spring 380 is located approximately above the fixing portion 362.

Figure 13:
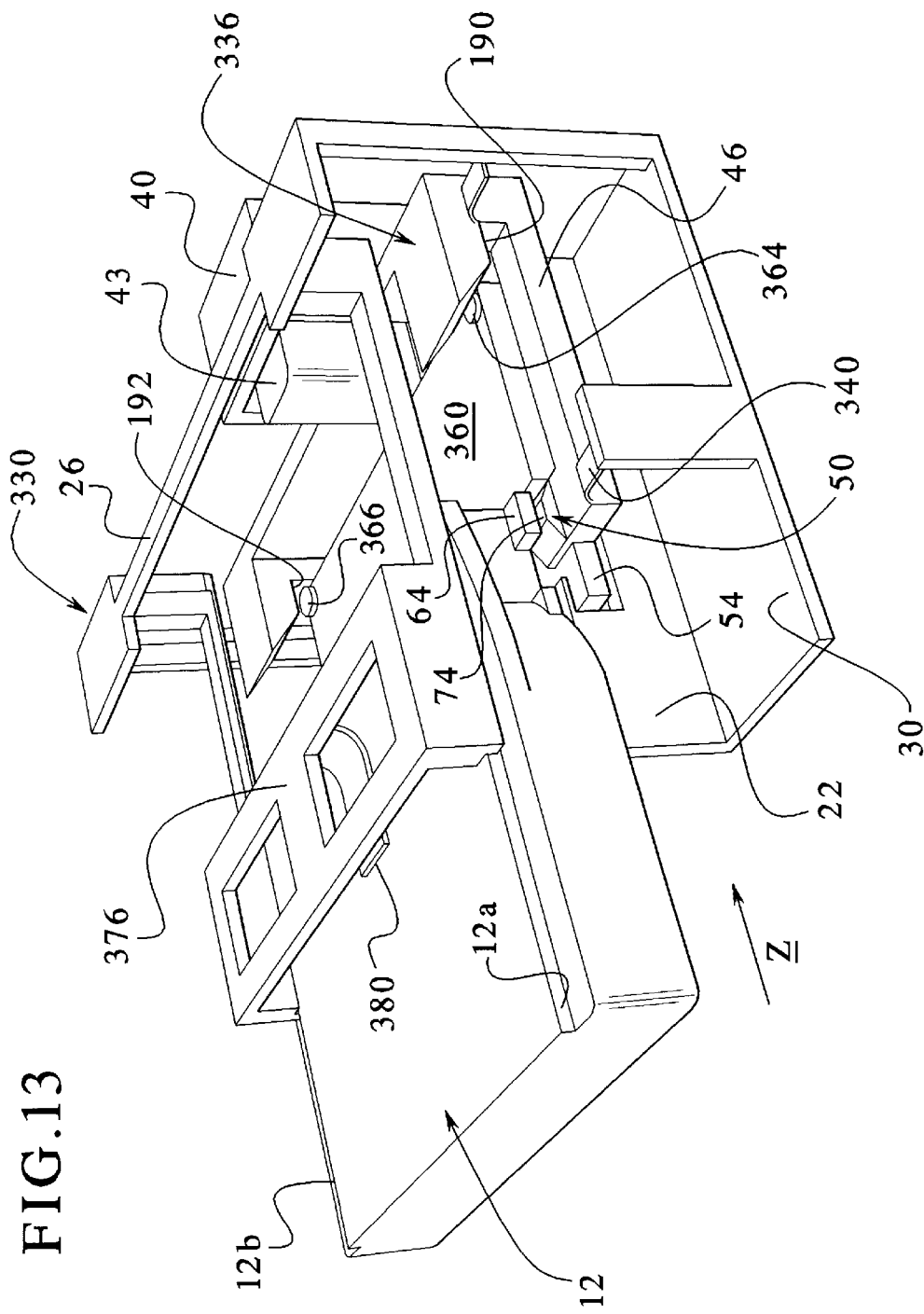
FIG. 13 is a perspective view of the alternate embodiment shown in FIG. 12, in a further stage of cartridge loading.
Figure 14:
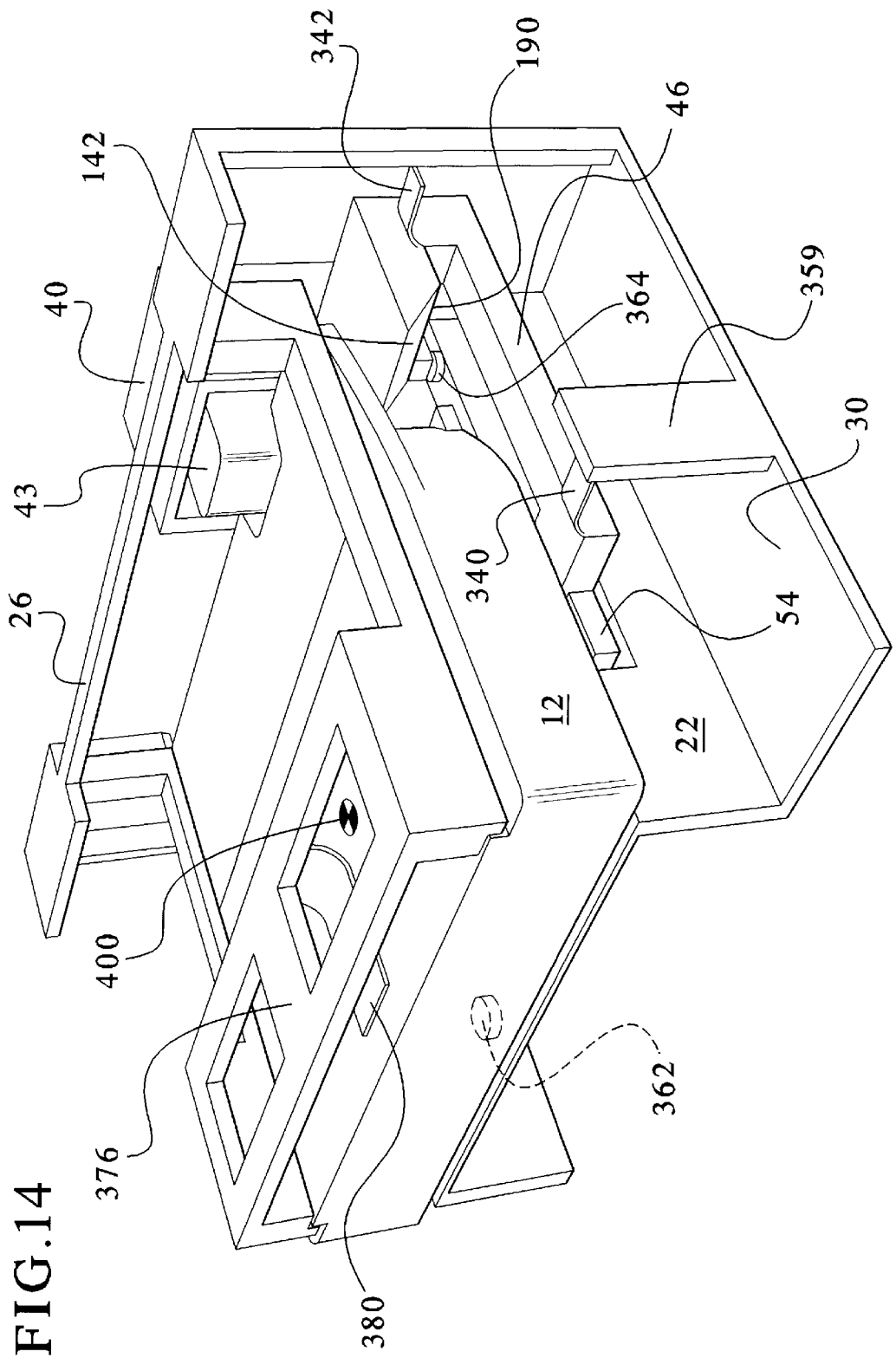
FIG. 14 is a perspective view of the alternate embodiment of FIG. 12 in a final stage of cartridge loading.

The initial loading interaction of the cartridge with the floating bridge including the operation of the guiding arm 50 is similar to the previously disclosed embodiment, for example the embodiment of FIG. 7. This is shown in the progressive loading shown in FIG. 13, where the portion 64, 64a depress the top portion 74 downwardly during insertion. When the cartridge is further inserted as shown in FIG. 14, the portions 64, 64a are held on the fixing portions 364, 366 by the undersides of protrusions 190, 192 which press on an upper surface of the portions 64, 64A to set the floating bridge reference to the cartridge reference. The leaf spring 380 presses a rear central portion of the cartridge 12 downwardly onto the fixing portion 362 for holding the cartridge 12 to the housing structure 330, reducing shock and vibration.

The cartridge fixing points to the frame 26 are therefore set by the fixing portions 362, 364, 366. A center of mass 400 of the cartridge, shown in FIG. 12, will reside within a triangle defined by the fixing portions 362, 364, 366 when the cartridge 12 is fully loaded. The reference loading of the cartridge to the floating bridge is therefore set by the surfaces 190, 192 at a front side, and the surface 74 at a rear side, defining a reference triangle.

The floating reference systems according to the present invention create the possibility of separating the reference points and the fastening points for the cartridge. The three fastening points which hold the cartridge can be chosen freely in order to include the center of mass of the carricart. Especially for TRAVAN cartridges, where the center of mass is outside the reference triangle, the present invention provides an increased vibration/shock-stable cartridge holding. The use of three separate fastening points will not affect the head relative to the cartridge reference points. A counter zenith spring force, from for example the leaf spring 380, larger than the zenith "bridge force", such as the upward force of zenith spring 340, can be added to the system.

Although the present invention has been described with reference to a specific embodiment, those of skill in the art will recognize that changes may be made thereto without departing from the scope and spirit of the invention as set forth in the appended claims.

I claim as my invention:

1. A device for precisely positioning a magnetic tape cartridge relative to a magnetic head, comprising:
   a stationary housing for receiving a tape cartridge; and
   a supporting structure resiliently mounted to said stationary housing and holding thereon a magnetic head, said structure resiliently engaging portions of said cartridge upon insertion of said cartridge into said housing to hold said cartridge in a fixed position relative to said magnetic head and resiliently relative to said housing.

2. The device according to claim 1, wherein said supporting structure comprises a bridge spanning a width of said tape cartridge and having two first engagement means across a width of said bridge and one second engagement means set back rearwardly from said first two engagement means, said structure engaging said cartridge, said three engagement means for setting the azimuth and zenith relative position of said magnetic head with respect to said tape cartridge.

3. The device according to claim 2, wherein said two first engagement means each comprise a movable surface and a spring between said movable surface and a portion of said stationary housing for clamping a portion of said cartridge between said movable surfaces and portions of said stationary housing.

4. The device according to claim 3, wherein said springs are arranged to exert a downward force on said movable surfaces to clamp said movable surface down onto a top portion of a bottom wall of said cartridge against said portions of said stationary structure.

5. The device according to claim 4, wherein said third engagement means comprises a spring mounted to a first portion of said stationary housing and pressing said cartridge against a second portion of said stationary housing.

6. The device according to claim 3, wherein said springs are located beneath said movable surfaces to clamp portions of said cartridge upwardly against said portions of said stationary structure.

7. The device according to claim 2, further comprising a third engagement means for holding said cartridge resiliently to said stationary housing, said third engagement means located rearwardly on said cartridge from said second engagement means.

8. The device according to claim 2, wherein said bridge comprises a magnetic head housing support structure arranged between ends of said bridge and holding a magnetic head and head positioning motor therein.

9. The device according to claim 8, wherein said bridge is held to said stationary housing by slots formed on opposite sides of said beam and pins extending from said stationary structure to reside within said slots.

10. A tape drive and tape cartridge combination, comprising:
    a tape drive having a housing structure with stationary support portions;
    a bridge mounted resiliently to said housing structure and precisely holding a magnetic head thereon;
    a tape cartridge having magnetic tape therein, said tape exposed in a window of said cartridge for being pressed to said magnetic head, said cartridge having a bottom wall;
    resilient support portions including first and second supporting surfaces arranged on said bridge on laterally opposite sides of said magnetic head and a third support surface arranged rearwardly of said first and second support surfaces said resilient support portions for pressing against said bottom wall for clamping said cartridge between said resilient support portions and said stationary support portions;
    first, second and third springs arranged respectively between said first, second and third support surfaces and said housing structure to bias said first, second and third support surfaces toward said cartridge; and
    wherein said third supporting surface includes an inclined surface for being impacted by said bottom wall of said cartridge during insertion of said cartridge into said tape drive, said inclined surface depressing said third support surface against the urging of said third spring as said cartridge is inserted into said tape drive.

11. The combination according to claim 10, wherein said resilient support portions provide a three point loading of said cartridge against said stationary support portions.

12. The combination according to claim 10, wherein said resilient portions provide a three point reference loading of said cartridge to said bridge, and further including a three point fixing loading of said cartridge to said housing structure which includes a fixing location outside a triangle formed by said three point reference loading.

13. The combination according to claim 10, wherein said bottom wall of said cartridge comprises laterally extending portions, and said first and second support surfaces are arranged to overlie said laterally extending portions to clamp said laterally extending portions to said stationary support portions.

14. The combination according to claim 10, wherein said first and second supporting surfaces each comprise a inclined surface facing said cartridge, and further insertion of said cartridge causes said bottom wall to impact said inclined surfaces to depress said first and second surfaces against the urging of said first and second springs, said bottom wall overlying said first, second and third support surfaces when in said fully inserted position.

15. The combination according to claim 14, wherein said stationary support portions comprise guide rails.

16. The combination according to claim 10, wherein said housing structure comprises a rectangular frame having inwardly directed pins for rotationally and slidingly connecting said bridge between said pins, and laterally spaced apart first and second support platforms, said first support platform supporting said first spring, and second support platform supporting said second and third springs.

17. The combination according to claim 10, wherein said bridge further comprises laterally angled, opposite side walls to guide said cartridge into a preselected lateral position with respect to said magnetic head.

18. A tape drive for receiving a tape cartridge having a bottom wall and an exposed portion of magnetic tape held therein, and the tape drive having a magnetic head to read from, or write onto, said magnetic tape, comprising:

a housing structure with stationary support portions;

a bridge mounted resiliently to said housing structure and holding a magnetic head thereon, said bridge establishing a preselected reference position between the cartridge and said magnetic head held on said bridge;

resilient support portions for clamping said tape cartridge loaded into said tape drive between said resilient support portions and said stationary support portions, said resilient support portions including first and second supporting surfaces arranged on said bridge on opposite lateral sides of said magnetic head, and a third support surface arranged rearwardly of said first and second support surfaces; and first, second and third springs arranged respectively between said first, second and third support surfaces and said housing structure to bias said first, second and third support surfaces toward the cartridge.

19. The tape drive according to claim 18, wherein said resilient support portions provide a three point loading of the cartridge against said stationary support portions.

20. The tape drive according to claim 18, wherein said resilient support portions provide a three point, triangular reference loading of the cartridge to the bridge.

21. The tape drive according claim 18, wherein said resilient support portions provide a three point triangular reference loading of the cartridge to the bridge, and a further resilient support portion located outside said triangular reference loading to clamp the cartridge to a further stationary portion of said housing structure to effect a three point, triangular fixing loading of said cartridge to said housing structure, a center of mass of said cartridge located within said triangular fixing loading.

22. The tape drive according to claim 10, wherein said third supporting surface includes an inclined surface for being impacted by the bottom wall of the cartridge during insertion of the cartridge into said tape drive, said inclined surface depressing said third support surface against the urging of said third spring as the cartridge is inserted into said tape drive.

23. The tape drive according to claim 10, wherein said first and second supporting surfaces each comprise a inclined surface facing the cartridge being inserted into the tape drive, and further insertion of the cartridge causes the bottom wall of the cartridge to impact said inclined surfaces so arranged to depress said first and second surfaces against the urging of said first and second springs, the bottom wall overlying said first, second and third support surfaces when in a fully inserted position in said tape drive.

24. The tape drive according to claim 10, wherein said housing structure comprises a rectangular frame having inwardly directed pins for rotationally and slidingly connecting said bridge between said pins, and laterally spaced apart first and second support platforms, said first support platform supporting said first spring, and said second support platform supporting said second and third springs.

25. The tape drive according to claim 18, wherein said stationary support portions comprise guide rails.

26. The tape drive according to claim 18, wherein said bridge further comprises laterally angled, opposite side walls to guide the cartridge into a preselected lateral position with respect to said magnetic head.

27. The tape drive according to claim 18, wherein said resilient support portions comprise inclined surfaces to cause depression of said resilient support portions by sliding contact of the cartridge being inserted into the tape drive.

* * * * *